(12) United States Patent
Groff

(10) Patent No.: US 8,739,741 B2
(45) Date of Patent: Jun. 3, 2014

(54) ELIZABETHAN COLLAR COVER

(71) Applicant: Jodi Michelle Groff, Lancaster, PA (US)

(72) Inventor: Jodi Michelle Groff, Lancaster, PA (US)

(*) Notice: Subject to any disclaimer, the term of this patent is extended or adjusted under 35 U.S.C. 154(b) by 0 days.

(21) Appl. No.: 13/644,405

(22) Filed: Oct. 4, 2012

(65) Prior Publication Data

US 2014/0096722 A1   Apr. 10, 2014

(51) Int. Cl.
*A01K 27/00* (2006.01)
(52) U.S. Cl.
USPC .......................................... 119/815; 119/856
(58) Field of Classification Search
CPC ...................................................... A01K 27/00
USPC .................. 119/815, 821, 850, 856, 858, 814
See application file for complete search history.

(56) References Cited

U.S. PATENT DOCUMENTS

| | | | | |
|---|---|---|---|---|
| 2,087,620 | A * | 7/1937 | Sarah Lipton | 2/311 |
| 5,456,274 | A * | 10/1995 | Selbee et al. | 132/275 |
| 5,970,921 | A * | 10/1999 | Fulton | 119/858 |
| D542,481 | S * | 5/2007 | Katz | D30/145 |
| D558,932 | S * | 1/2008 | Farrar | D30/152 |
| D643,160 | S * | 8/2011 | Welles | D30/152 |
| 2005/0132981 | A1* | 6/2005 | Berry | 119/856 |
| 2007/0181080 | A1* | 8/2007 | Gibson | 119/815 |
| 2009/0107419 | A1* | 4/2009 | Davis | 119/815 |
| 2009/0159016 | A1* | 6/2009 | Lang et al. | 119/863 |

* cited by examiner

*Primary Examiner* — Rob Swiatek
*Assistant Examiner* — Ebony Evans
(74) *Attorney, Agent, or Firm* — Steve O'Donnell

(57) ABSTRACT

A covering for protective collars used to prevent an animal from licking or biting at wounds or injuries (an "Elizabethan collar," or "e-collar"), is disclosed. The covering is made of a material that prevents the Elizabethan collar from irritating an animal's neck. The covering is easily removed by the animal's caretaker and can be laundered or changed as desired. The covering is sized to accommodate a range of Elizabethan collars.

1 Claim, 3 Drawing Sheets

ELIZABETHAN COLLAR COVER

FIELD OF THE INVENTION

The subject matter of this application relates to devices used to prevent an animal from reaching parts of its body. In particular, the invention relates to coverings for such devices.

BACKGROUND

Protective collars are often used in veterinary medicine to prevent an animal from reaching parts of its body with its mouth. Perhaps most commonly, the collars are used with dogs, although almost any animal can be so protected. For example, following an animal being spayed or neutered, a protective cover may be placed around its neck to prevent the animal from biting or licking the wound dressing or exposed sutures.

Usually these collars are cut from a single piece of plastic a few millimeters thick and formed into the shape of cones around an animal's neck so that the narrow portion of the cone surrounds the animal's neck and the wider portion extends to the top of the animal's head or further. The body of the cone thereby forms a physical impediment to the animal reaching parts of its body. Once secured, the narrow portion of the cone, being more narrow than the animal's mandible, should prevent the animal from getting out of the collar. Due to the general appearance of the protective collar in use, they are often called "Elizabethan collars."

These collars are most often made from a sheet of somewhat flexible plastic; and, since the basic design can be manufactured at a comparatively low cost, there are several manufacturers in the market. Even so, the art describes variations on the general theme of Elizabethan collars. For example, U.S. Pat. No. 5,012,764 discloses adjustable collars that can be reapplied after removal. U.S. Pat. No. 5,197,414 discloses a variation wherein the collar is designed to allow water to freely flow out of it so that although an animal's head is blocked, it can still be safely washed. U.S. D632851 is another example of a patent claiming a design of an Elizabethan collar.

Other patents have disclosed other styles of Elizabethan collars using materials and methods that are less likely to irritate the animal where the collar touches its neck. For example, U.S. Pat. No. 6,659,046 discloses an inflatable collar with an optional foam layer that can be placed on an animal without having to slide the collar over the animal's neck. U.S. Pat. No. 4,476,814 discloses a collar comprising a solid foam and an adjustable closing means. A recovery collar is disclosed in U.S. Pat. No. 6,044,802 that comprises a doughnut shaped pillow held in place by a drawstring laced through a shawl that extends into the center hole of the pillow. U.S. Pat. No. 8,042,494 discloses an Elizabethan collar, similar in some respects to the subject matter of U.S. Pat. No. 5,012,764, but that comprises sheets of a flexile material and a sheet of a resilient material so that the resulting collar resists deformation, but also yields to reduce irritation to the animal's neck region.

Elizabethan collars formed of ridged plastic may irritate an animals neck, but they are effective and comparatively simple and lower-priced than the other options that are formed out of softer materials. Unfortunately, using softer, less irritating materials may lessen the effectiveness of the collar and permit the animal to reach parts of its body with it's tongue and teeth.

SUMMARY

The subject matter of this application pertains to removable coverings for Elizabethan collars. As used below, an "Elizabethan collar" or an "e-collar" is defined as those animal protective covers, formed from a substantially flat piece of plastic or other similarly flexible material, that are designed to fit around an animal's neck and prevent the animal from licking or biting at wounds or injuries. An object of this inventions is to provide a removable covering for an Elizabethan collar that reduces the irritation an animal would experience where a traditional Elizabethan collar would rest. Another object is to provide for such a collar covering that can be removed and laundered. Yet another object is to provide for a decorative covering for an Elizabethan collar.

DETAILED DESCRIPTION OF THE DRAWINGS

Figure 1:
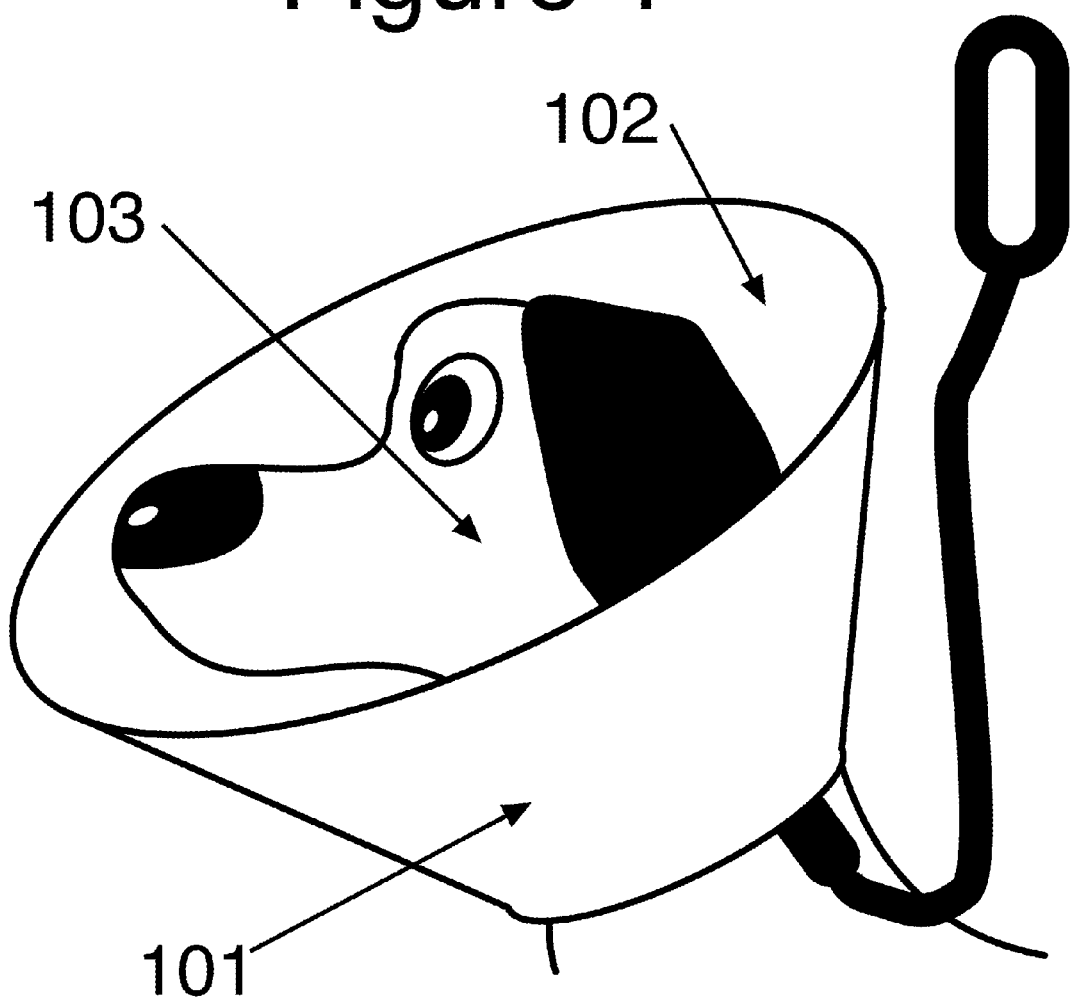
FIG. 1 is a perspective view of a collar cover surrounding an Elizabethan collar worn by a dog.

The following descriptions and drawings referenced therein illustrate embodiments of the applications subject matter. They are not intended to limit the scope. Those familiar with analogous arts may recognize that other embodiments of the subject matter are possible. All such alternative embodiments should be considered within the scope of the application's claims.

Each reference number consists of three digits. The first digit corresponds to he figure number in which that reference number is first used. Reference numbers are not necessarily discussed in the order of their appearance in the figures.

The application discloses a soft covering for an Elizabethan collar ("e-collar"). The covering surrounds the typically plastic e-collar and cushions the animal's neck from the irritation that would otherwise occur. The covering is adjustable to accommodate a range of e-collars from different manufacturers. Another advantage of the covering is that it can be removed from the e-collar and laundered. Also, the cover may be made of nearly any type of fabric to decorate the e-collar. As used below, "fabric" is understood to mean not only textiles, but any pliable material that would not cause irritation to an animal's neck when used as described in this application.

In the preferred embodiment, the collar cover is fashioned from an outer semi-circular piece of fabric (101) and an inner semi-circular piece of fabric (102). Further, said outer semi-circular piece of fabric has an inner face (302) and an outer face (301); said inner semi-circular piece of fabric also has an inner face (304) and an outer face (303). Each of those said pieces of fabric having a bottom curved portion (201) and an top curved portion (202), said top curved portion of the outer semi-circular piece of fabric and said top curved portion of the inner semi-circular piece of fabric sewn or otherwise bonded together along their outermost edge (205), and said bottom curved portion of the outer semi-circular piece of fabric and said bottom curved portion of the inner semi-circular piece of fabric sewn or otherwise bonded together along their outermost edge (206), so that the bottom and top curved portions are joined while either the first terminal end (203) or the second terminal end (204) of the cover, or both, are left open to allow for the insertion of an c-collar. In this manner, the collar cover forms a semi-circular sheathe with said inner face (302) of the said outer semi-circular piece of fabric (101) and said inner face (304) of the said inner semi-circular semi-circular piece of fabric (102) facing each other and being largely in contact with each other when the collar cover does not contain an e-collar and is flat, but, so that when the bottom curved portions (201) and the top curved portions (202) are pressed towards each other, a channel (305) is formed that can accommodate the insertion of an e-collar (207).

Figure 2:
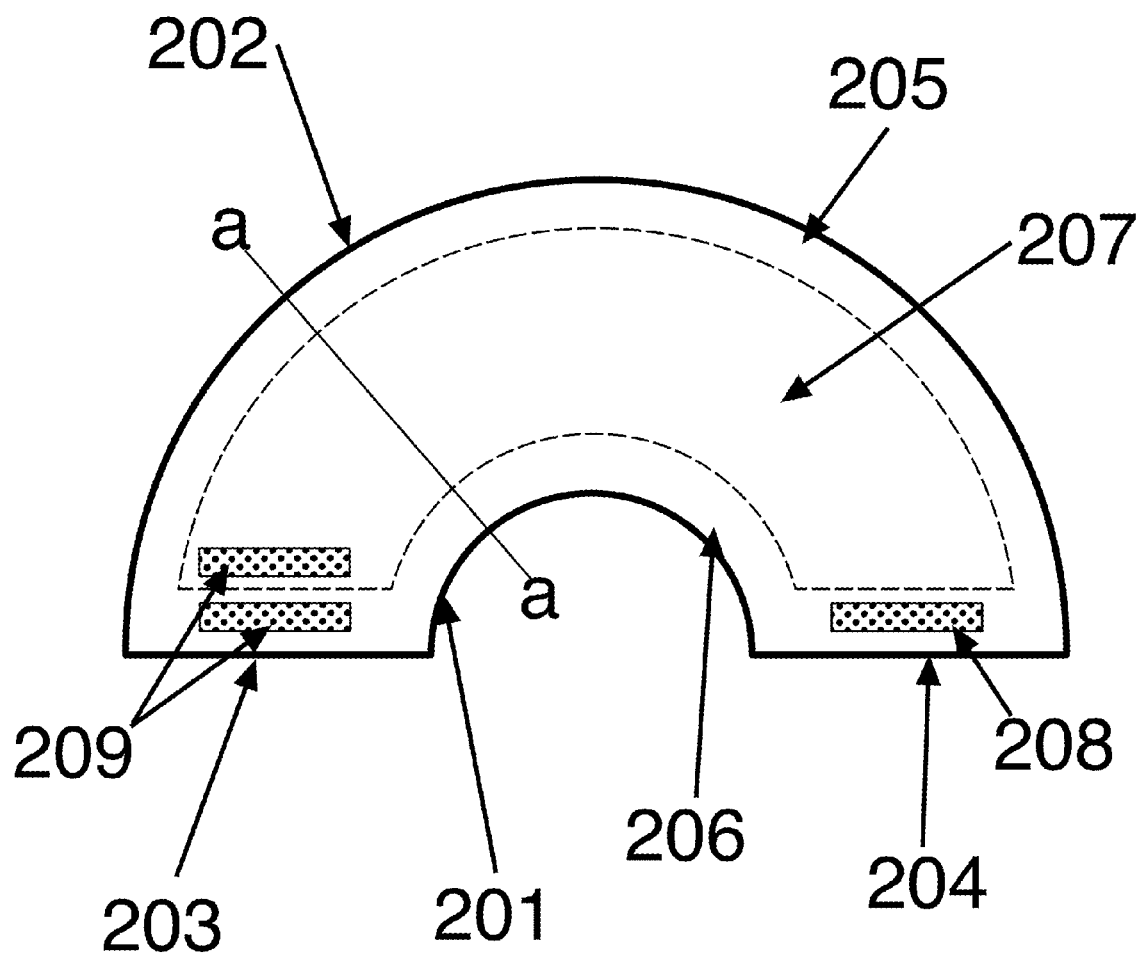
FIG. 2 is a plan view of the collar cover containing a flat Elizabethan collar, shown in dashed lines.
Figure 3:
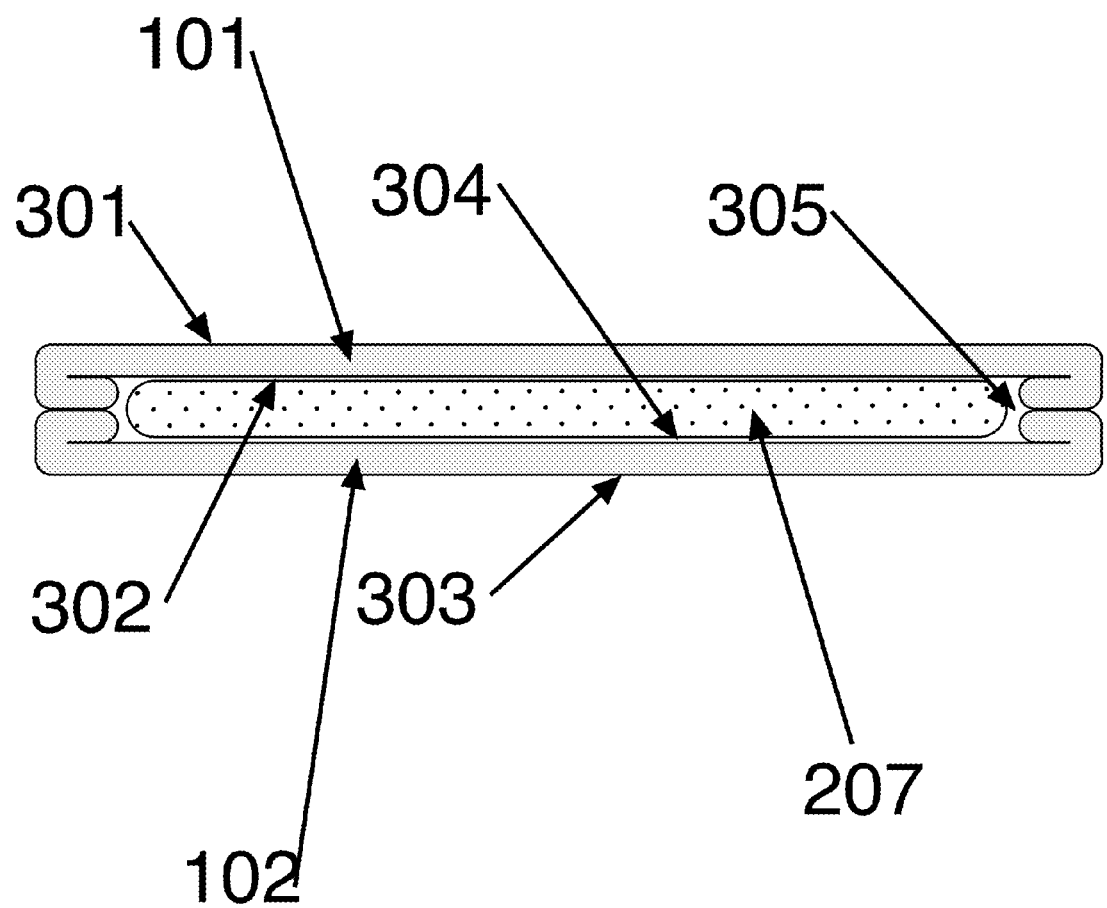
FIG. 3 is a cross sectional view of one end of the collar cover of FIG. 2 taken approximately along line a-a. To show detail, the dimensions of FIG. 3 are exaggerated. In most embodiments, the depth of the collar cover will be under a centimeter.

The two pieces of fabric (101 and 102) are of approximately the same size and shape. For illustration, only one of the said pieces of fabric is show in FIG. 2. The e-collar (shown in dashed lines, 207), encased in the covering is wrapped about the animal's head (103) and secured by an adjustable fastening means such as hook (208) and loop (209) regions. In FIG. 2, the hook (208) and loop (209) regions are shown on the same face of the e-collar. In most embodiments, the hook and loop regions will be on different faces of the e-collar to more easily permit their fastening. Further, the two pieces of fabric each may have an optional notch in their bottom curved portion, each said notch having the same approximate size and position on each of the inner semi-circular piece of fabric and the outer semi-circular piece of fabric. These notches, if present, allow a leash to be led through the notch and attached to the animal's collar.

The fastening means may also comprise buckles, snaps, zippers, or other means of fastening. The fastening means, in a most preferred embodiment, is adjustable so that a collar cover maybe used in conjunction with an e-collar to fit those necks that are either too large, or too small, to be comfortably protected by the bare c-collar. This adjustment capability increases the usable range of the e-collar so that the same e-collar may be used with multiple animals, or on the same animal throughout its lifespan, without the caretaker needing to permanently customize a single e-collar, or have multiple e-collars.

In all useful embodiments, the channel (305) is of sufficient size to accommodate insertion of an e-collar. Further, the width and breadth of the semi-circular pieces of fabric are such that an e-collar inserted into channel (305) if fully covered by the collar cover. FIG. 2 shows an e-collar (in dashed lines) inserted into the collar cover.

Following the insertion of he e-collar, the collar cover is wrapped around an animal's next and reversibly secured though the use of a fastening means.

Some designs of e-collars also have loops located along the edge of the collar's bottom curved portion (201) In use, these tabs are intended to be threaded by the animal's collar so that the collar holds the e-collar in place. When such c-collars are used, they may be inserted without modification into the collar cover, provided that adequate channel space exists in the collar cover. If necessary, or desired, the tabs found on certain e-collars may be removed or bent out of the way to allow insertion into the collar cover. Since e-collars do not have a standardized size, it is impossible to give accurate measurements for the collar covers. Often, e-collars are sold in x-small, small, medium, large, and x-large sizes, and these sizes would normally be expected to fit the majority of dogs, although other manufacturers may produce other sizes on the ends of the size spectrum to encompass more extreme-sized animals. The cover collars are designed to accommodate a range of e-collars within each of the common size ranges.

Some optional embodiments of the collar cover further comprise loops extending from the collar cover's bottom curved portion (201). If present, the animal's collar can be threaded though the loops Such loops allow for the animal's collar to partially support the collar cover and associated e-collar.

I claim:

1. A covering for protective collars comprising a semi-circular tube of fabric having an open left edge and an open right edge; said semi-circular tube having an outer surface, and an inner surface; said inner surface capable of forming a channel in which a predominantly flat protective animal collar can be inserted, so that the protective animal collar is ensheathed by said semi-circular tube of fabric, said covering for protective collars further comprising at least one fastening means that allows the said semi-circular tube of fabric to be formed into a cone-shaped configuration and reversibly bound in said cone-shaped configuration.

* * * * *